United States Patent
Liu et al.

(10) Patent No.: US 12,430,331 B2
(45) Date of Patent: Sep. 30, 2025

(54) METHOD, DEVICE, AND COMPUTER PROGRAM PRODUCT FOR QUERYING STORAGE SYSTEM

(71) Applicant: Dell Products L.P., Round Rock, TX (US)

(72) Inventors: Shuqin Liu, Shanghai (CN); Menglei Liang, Shanghai (CN); Hao Sun, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 18/498,296

(22) Filed: Oct. 31, 2023

(65) Prior Publication Data

US 2024/0362218 A1     Oct. 31, 2024

(30) Foreign Application Priority Data

Apr. 28, 2023 (CN) .......................... 202310485835.X (51) Int. Cl.
     *G06F 16/2453*      (2019.01)
     *G06F 16/242*      (2019.01)
     *G06F 16/25*      (2019.01)

(52) U.S. Cl.
     CPC .... *G06F 16/24534* (2019.01); *G06F 16/2448* (2019.01); *G06F 16/25* (2019.01)

(58) Field of Classification Search
None
See application file for complete search history.

(56) References Cited

U.S. PATENT DOCUMENTS

| | | | |
|---|---|---|---|
| 10,990,286 B1 | 4/2021 | Srinivasan et al. | |
| 2004/0220923 A1 | 11/2004 | Nica | |
| 2010/0145946 A1* | 6/2010 | Conrad | G06F 16/9566 714/48 |
| 2021/0149895 A1* | 5/2021 | Tran | G06F 16/2452 |
| 2021/0182253 A1 | 6/2021 | Quesnelle et al. | |
| 2023/0127572 A1* | 4/2023 | Jacob | G06F 21/6227 707/755 |
| 2024/0281423 A1* | 8/2024 | Perrin | G06F 16/2453 |

* cited by examiner

*Primary Examiner* — Irene Baker
(74) *Attorney, Agent, or Firm* — BainwoodHuang (57) ABSTRACT

Techniques for querying a storage system involve receiving a query request for querying a resource in the storage system, determining a query type of the query request according to configuration information, generating a corresponding query statement according to the query type, and querying the resource from the storage system through the query statement. Accordingly, a query result can be obtained by generating a query statement (or referred to as "query expression") corresponding to a query request to query the corresponding database directly, thereby improving the query efficiency in making queries to the storage system and enhancing the user experience. Such techniques can be easily integrated into any product having query needs (e.g. a storage system product), thus improving the product development efficiency and the ease of use and maintainability of the product.

18 Claims, 11 Drawing Sheets

METHOD, DEVICE, AND COMPUTER PROGRAM PRODUCT FOR QUERYING STORAGE SYSTEM

CROSS-REFERENCE TO RELATED APPLICATION

This application claims priority to Chinese Patent Application No. CN202310485835.X, on file at the China National Intellectual Property Administration (CNIPA), having a filing date of Apr. 28, 2023, and having "METHOD AND DEVICE FOR QUERYING STORAGE SYSTEM AND COMPUTER PROGRAM PRODUCT" as a title, the contents and teachings of which are herein incorporated by reference in their entirety.

TECHNICAL FIELD

Embodiments of the present disclosure relate to the field of storage systems, and particularly, to a method, a device, and a computer program product for querying a storage system.

BACKGROUND

With the expansion of the capacity and functionality of storage systems, the demand for access to storage systems is getting higher and higher. Therefore, there is a growing interest in the efficiency of access to storage systems.

However, due to the limitations of a storage system architecture, some access operations for storage systems are difficult to be quickly located to a target location in the storage system, resulting in a low efficiency of access to the storage system and a poor user experience.

SUMMARY OF THE INVENTION

The embodiments of the present disclosure provide a method, a device, and a computer program product for querying a storage system.

According to a first aspect of the present disclosure, a method for querying a storage system is provided. The method includes: receiving a query request for querying a resource in the storage system; determining a query type of the query request according to configuration information; generating a corresponding query statement according to the query type; and querying the resource from the storage system through the query statement.

According to a second aspect of the present disclosure, an electronic device is provided. The electronic device includes at least one processor; and a memory coupled to the at least one processor and having instructions stored thereon, wherein the instructions, when executed by the at least one processor, cause the device to perform actions including: receiving a query request for querying a resource in the storage system; determining a query type of the query request according to configuration information; generating a corresponding query statement according to the query type; and querying the resource from the storage system through the query statement.

According to a third aspect of the present disclosure, a computer program product is provided. The computer program product is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, wherein identical reference numerals generally represent identical components in the example embodiments of the present disclosure.

In the accompanying drawings, identical or corresponding numerals represent identical or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the protection scope of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

For the convenience of description, the present disclosure will be described below by taking a storage system under the REST (Representational State Transfer) specification as an example. It should be understood that the present disclosure is applicable to other types of storage systems.

Generally, for a storage system under the REST specification (hereinafter referred to as "REST storage system" or "storage system"), access requests (REST requests) received from the outside of the storage system will be classified as GET class requests and SET class requests. The GET class requests are, for example, query requests, and the SET class requests are, for example, patch requests, post requests, or delete requests.

For the SET class requests, the REST storage system accesses the corresponding database (DB) in the storage system through a microservice to perform the corresponding patch operation, post operation, or delete operation. For example, the microservice may include a storage and compute microservice, a clustering microservice, a discovery microservice, a security microservice, or a vasa microservice that has a corresponding command processor.

For most GET class requests, the storage system directly accesses a corresponding database, for example, the PostgreSQL database, in the storage system through PostgREST, so as to quickly acquire data from the database. The above PostgREST is a service provided by a third-party provider outside the storage system, which is an independent network service, and can directly access the PostgreSQL database through RESTful API (Application Programming Interface).

For a REST storage system, most of its product-related data are stored in a PostgreSQL database, and the query operation for the REST storage system requires PostgREST-based services, so the conventional REST storage system only supports PostgREST-type query requests. However, due to some design reasons of the REST storage system, some of the data (for example, the user account information, the security information, or the system startup information) is not stored in the PostgreSQL database, but in a database such as an SQLite database. In this case, it is not possible to query data directly from the SQLite database via PostgREST, but rather the query request needs to be subjected to conversion processing by the microservice so as to query the relevant data from the SQLite database, which results in a low efficiency of query.

The processing of access requests via the microservice path is often time-consuming as various microservices included in the microservice often have complex processing processes to deal with various operations (e.g., the query operation, the patch operation, the post operation, or the delete operation) for various databases (e.g., the PostgreSQL database and the SQLite database) corresponding to various access requests. As a result, the query efficiency is low when some GET class requests need to be corresponded to the PostgreSQL database via microservices. This also leads to heavy tasks and low efficiency in the development stage.

In addition, the above approach to handling GET class requests requires the various microservices included in the microservice to have the ability to handle both GET class requests and SET class requests, thus resulting in an excessive workload for the microservice, which further affects the overall operation efficiency of the storage system. In addition, as query operations for conventional REST storage systems are based on services from PostgREST, query requests for REST storage systems are all limited by the features, the performance, or the version of the PostgREST. Therefore, while some GET class query requests are handled through microservices, query requests for REST storage systems can only be PostgREST-type query requests that conform to the PostgREST framework that is being used. This leaves the setting of the query approach for the REST storage system to be limited and does not allow for the creation of customized query methods for users. In addition, it is difficult for storage products to use query operations for various databases in their own systems, and switching from one query approach to another is costly. According to the ideas provided in the present disclosure, it is possible to enable a storage system to easily and conveniently integrate various query approaches. The method, the electronic device, and the computer program product for querying a storage system of the present disclosure are capable of overcoming at least some of the above disadvantages. Embodiments of the present disclosure are described below still using the REST storage system as an example, but it should be understood that the present disclosure is applicable to other storage systems, such as storage systems having similar deficiencies to the REST storage system described above.

Figure 1:
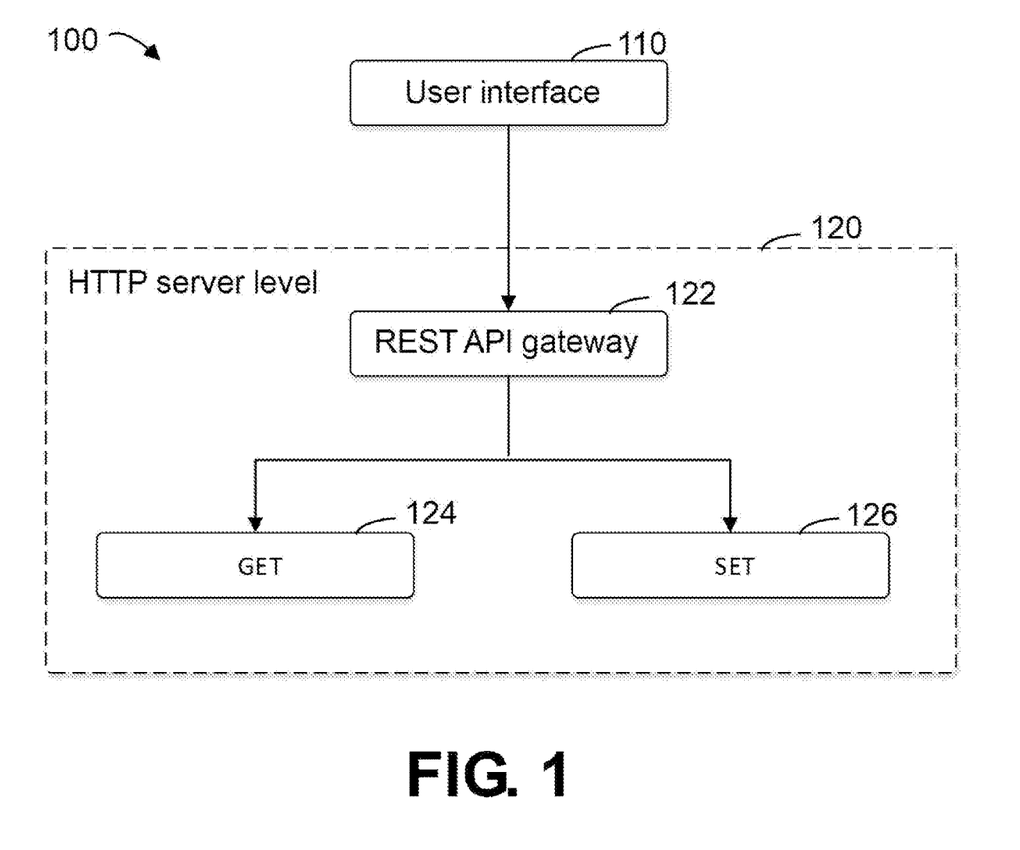
FIG. 1 illustrates a schematic diagram of access to a storage system according to an embodiment of the present disclosure.

FIG. 1 illustrates a schematic diagram 100 of access to a storage system according to an embodiment of the present disclosure.

Referring to the schematic diagram 100 of FIG. 1, a user interface 110 may receive an access request from the outside (e.g., a user) of the storage system. A REST API gateway 122 in an HTTP (Hypertext Transfer Protocol) server level 120 may divide access requests into GET class requests 124 and SET class requests 126.

All the GET class requests 124 can access corresponding databases (not shown) directly via corresponding APIs (not shown) and thereby query corresponding data (resources), while all the SET class requests are handled via microservices (not shown).

Figure 2:
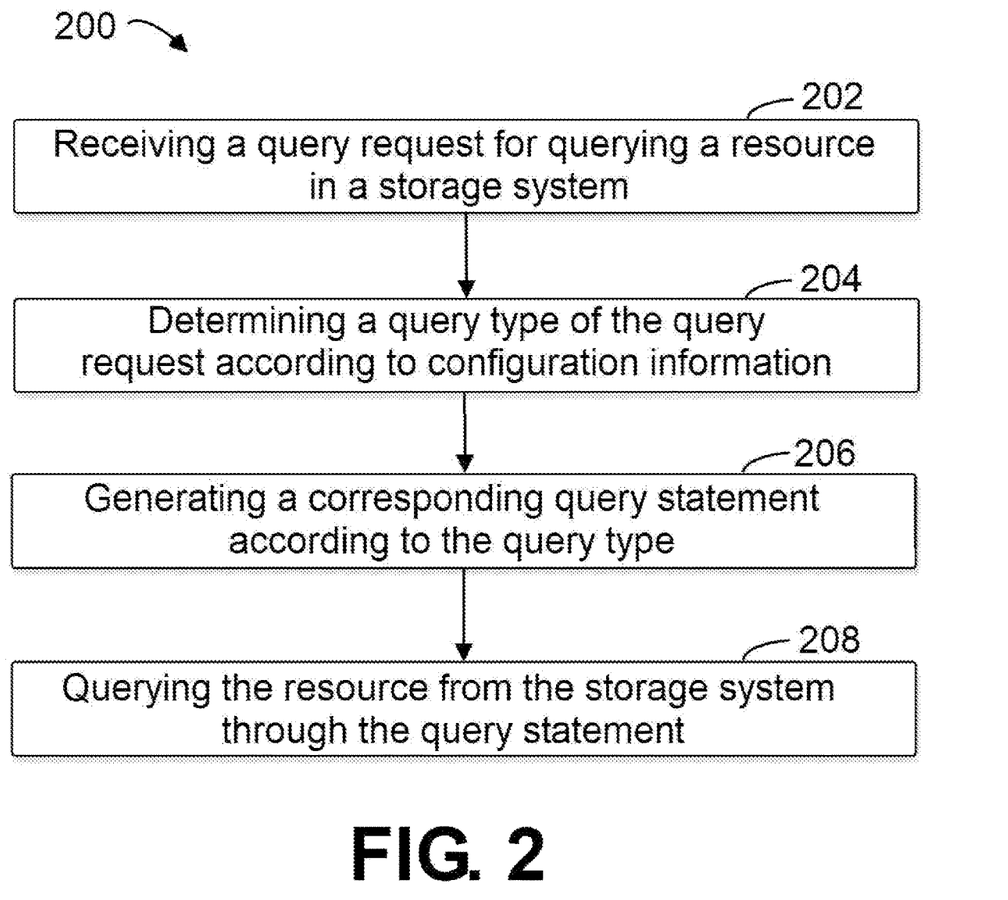
FIG. 2 illustrates a flow chart of a method for querying a storage system according to an embodiment of the present disclosure.
Figure 3:
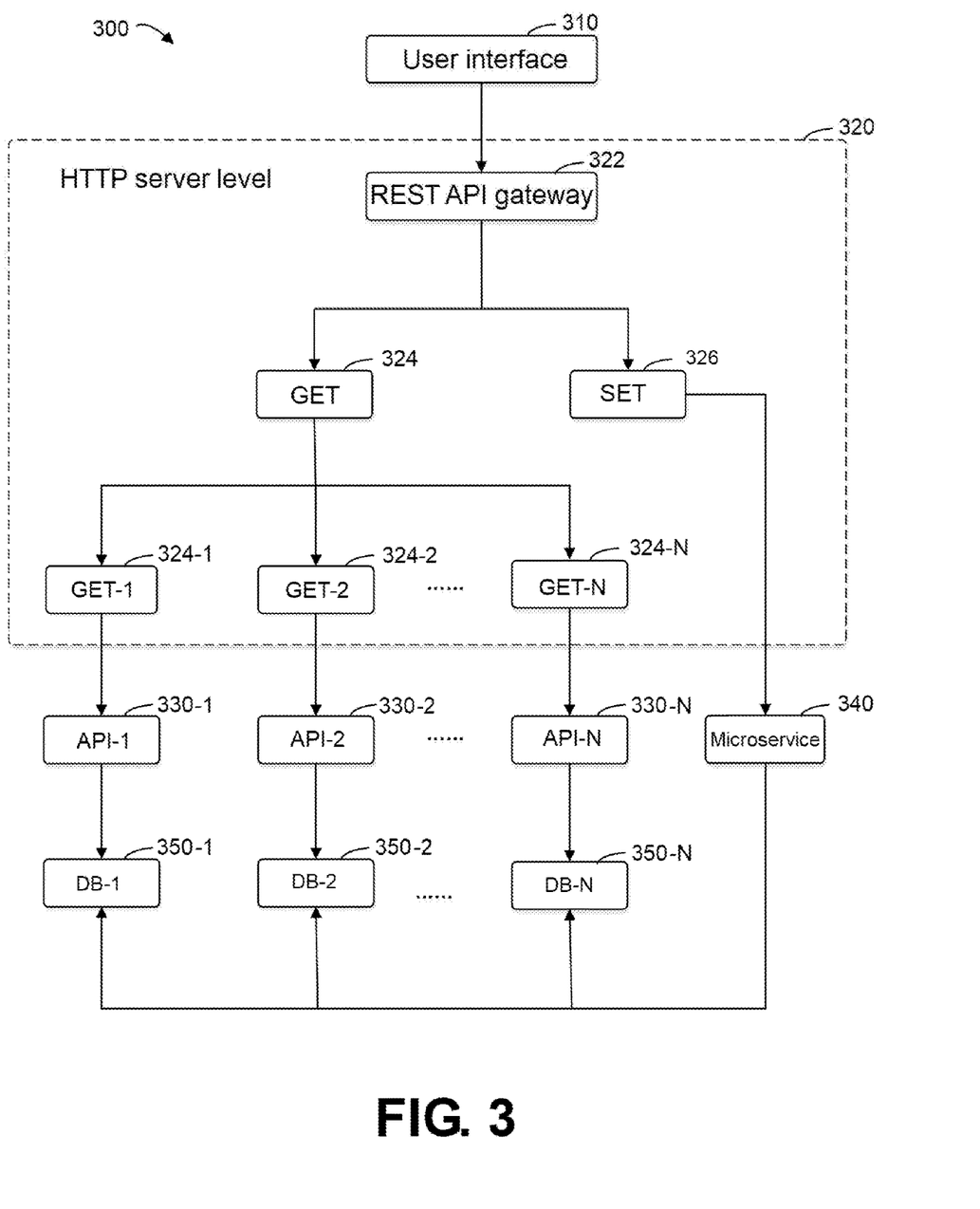
FIG. 3 illustrates a schematic diagram of access to a storage system according to an embodiment of the present disclosure.

An embodiment of the present disclosure is described below with reference to FIGS. 2 and 3. FIG. 2 illustrates a flow chart 200 of a method for querying a storage system according to an embodiment of the present disclosure. FIG. 3 illustrates a schematic diagram 300 of access to a storage system according to an embodiment of the present disclosure.

With reference to FIG. 2, at 202, a query request for querying a resource in the storage system is received, for example, the GET class request 324 described above. In one embodiment, for example, in the case of a REST storage system, the query request received at 202 may be a query request conforming to the REST specification. The queried resource may be any data in the storage system. For example, the query request may be received through a user interface 310 of FIG. 3 (similar to the user interface 110 of FIG. 1). The user interface 310 may be any type of user interface that can receive query requests from users or other external devices.

At 204 of FIG. 2, a query type of the query request is determined according to configuration information. For example, the query type can be determined by the processor at a REST API gateway 322 in an HTTP server level 320 shown in FIG. 3 or any other processor not shown. The query types that the storage system can handle may be set differently for different storage systems, which will be described in detail below. For example, FIG. 3 illustrates N query types GET-1 (324-1), GET-2 (324-2), . . . , and GET-N(324-N).

At 206 of FIG. 2, a corresponding query statement (or referred to as "query expression") is generated according to the query type. This query statement may be a statement that enables an access to the database in which the requested resource is located through the corresponding type of query interface API so as to perform a query. The query statement, the type of API (e.g., API-1 (330-1), API-2 (330-2) . . . . API-N(330-N), etc., illustrated in FIG. 3), or the type of database (e.g., database DB-1 (350-1), DB-2 (350-2), . . . , DB-N(350-N), etc., illustrated in FIG. 3) can be set differently for different storage systems, which will be described in detail below.

At 208 in FIG. 2, the resource is queried from the storage system through the query statement. In one embodiment, the query result for the requested resource can be acquired from the corresponding database through the query statement determined in 206 via the corresponding query interface.

According to the above method of embodiments of the present disclosure, a query result can be obtained by generating a query statement corresponding to a query request to query a corresponding database directly, thereby improving the query efficiency in making queries to the storage system and enhancing the user experience. In addition, according to the above method, no microservice is required to process any query requests, thus reducing the workload of the microservice and thus further improving the overall operation efficiency of the storage system. In addition, with the above method, it is possible to enable the query approach for the storage system to be customized according to the user's needs, which improves the flexibility of the storage system and thus further enhances the user experience. For example, the query types, the API types, the types of storage resources, or the types of databases supported by the storage system can be customized as described below.

Figure 4:
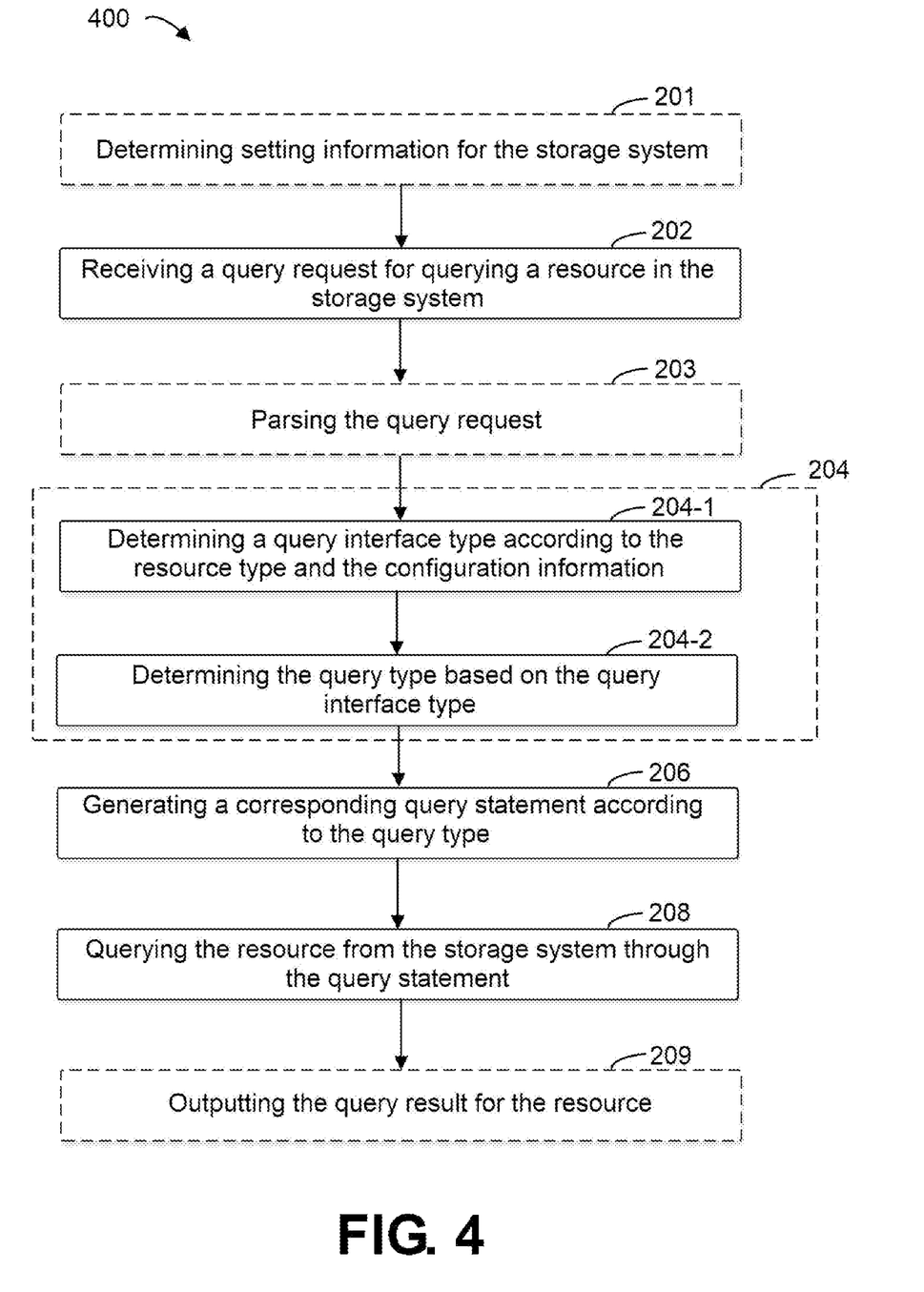
FIG. 4 illustrates a flow chart of a method for querying a storage system according to another embodiment of the present disclosure.

An example of a method for querying a storage system according to embodiments of the present disclosure is described in detail below with reference to FIGS. 3 and 4. FIG. 4 illustrates a flow chart 400 of a method for querying a storage system according to another embodiment of the present disclosure. The flow chart 400 of FIG. 4 differs from the flow chart 200 of FIG. 2 in that the flow chart of FIG. 4 further includes blocks 201, 203, and 209, and FIG. 4 illustrates block 204 of FIG. 2 using blocks 204-1 and 204-2.

Referring to FIG. 4, at 201, configuration information (or referred to as "setting information") for the storage system can be determined. In one embodiment, the storage system may include a plurality of databases of different database types, for example, a PostgreSQL-type database, an SQLite-type database, or other types of databases. For example, the databases DB-1 (350-1), DB-2 (350-2), . . . , DB-N (350-N), etc., in FIG. 3 may indicate different types of databases. Each database type may have at least one corresponding database. For example, each type of database in FIG. 3 (DB-1 (350-1), DB-2 (350-2), . . . . DB-N(350-N)) may each include at least one database. For example, a PostgreSQL type database may include a cluster database (Cluster DB) and a local database (Local DB). A database of the SQlite type may include a number of memory databases (Memory DB), among others.

In addition, each database type may have a corresponding query interface type (API type). In one embodiment, the query interface type may include at least one of: a PostgREST type, a JDBC type, a Jooq type, or any other types. For example, the interfaces API-1 (330-1), API-2 (330-2), . . . , API-N (330-N), and so on, illustrated in FIG. 3, may indicate different interface types.

In the storage system, resources of each resource type may be stored in at least one database of a corresponding database type. In the above case, determining the setting information for the storage system in 201 may include determining at least one of: a correspondence between query interface types and resource types applied to the storage system; a correspondence between query interface types and database types applied to the storage system; a correspondence between database types and resource types applied to the storage system; one or more databases in which each type of resource of the storage system is stored; or formats of query statements applied to the storage system. For example, a mapping table for the above setting information (configuration information) may be established or received in 201.

Here, each query interface type, each resource type, and each database type applied to the storage system may be set differently according to different actual requirements. Therefore, various correspondences included in the above setting information can be set differently according to different requirements of different storage systems.

At 202 in FIG. 4, a query request for querying a resource in the storage system is received. At 203 in FIG. 4, the query request can be parsed to obtain query information for the resource (that is, the query request is "understood" in 203). In one embodiment, the obtained query information for the resource may include at least one of: a resource type of the resource, a filtering condition for the resource, or an output condition for the resource. For example, syntax parsing can be performed on the query request by any language recognition tool (e.g., ANTLR, machine learning tools, etc.) to obtain the query information for the resource.

Here, the classification method for the resource types in the storage system may be determined in 201 (for example, acquired from the outside (for example, the user) in 201). For example, the resource type of the resource in the storage system determined in 201 may include at least one of: disk volume, file_system, local_user, alert, hardware information, port information, or the like.

In one example, for example, the following information can be obtained by means of parsing in 203: the user wants to query all disk volumes of which the names include "Test" and output only the identification (id), the name, and the property description, which are output in an ascending order of names. In this example, the resource type may be disk volume, the filtering condition may be test, and the output condition may be an identification, a name, a property description, and an ascending order of names.

After the query information is parsed out, in 204-1 of FIG. 4, a query interface type of a query interface corresponding to the resource type can be determined according to the resource type and the configuration information (or setting information) for the request, wherein the query interface is an interface for accessing a database storing the resource of the resource type in the storage system. For example, in the case of the above example, if the correspondence determined in 201 indicates that the resource of the "disk volume" type is stored in the PostgreSQL-type database, whereas the PostgreSQL-type database needs to be accessed through an interface of the PostgREST type, then the query interface type can be determined to be the PostgREST type.

At 204-2 in FIG. 4, the query type may be determined based on the determined query interface type. For example, the determined query interface type may be determined as the query type. In the case of the above example, it can be determined that the query type is the PostgREST type.

It should be understood that the above is only an example, and the setting information determined in 201 may be different from the above, for example, a resource of the "disk volume" type may be stored in a database of the SQLite type, where this database of the SQLite type may be accessed through a query interface of the JDBC type or the Jooq type, so that the query type determined in 204-2 can be accordingly of the JDBC type or the Jooq type.

At 206 of FIG. 4, a query statement corresponding to the query type determined in 204-2 may be generated according to the filtering condition parsed out in 203. For example, the corresponding query statement may be generated according to the format of the query statement indicated in the setting information determined in 201. In the above example, when the query type determined in 204-2 is the PostgREST type, the query statement generated in 206 may be "/volume?select=id,name,description &name=eq.Test"; and when the query type determined in 204-2 is the JDBC type, the query statement generated in 206 may be "select id, name, description from volume where name 'Test'".

At 208 in FIG. 4, a query result for the resource may be acquired from the corresponding database in accordance with a predetermined query rule via the corresponding query interface through the query statement (or query expression) generated in 206. In one embodiment, the predetermined query rule may include at least one of: query by row, query by column, or query by page. In addition, in one embodiment, in the case where the setting information in 201 indicates that the queried resource is stored in at least two databases, the query rule may also include querying the at least two databases simultaneously or querying the at least two databases sequentially.

At 209 in FIG. 4, the query result for the resource acquired in 208 may be output in accordance with the output condition for the resource parsed out in 203. For example, in the case of the above example, the identification, the name, and the property description are output, and they are output in an ascending order of names.

It should be understood that the above is only an example of querying the storage system, and in other implementations, some blocks may be added, modified, deleted or merged in the above flow chart. For example, in practical applications, block 206 of FIG. 4 can be modified and blocks 208 and 209 can be merged.

For example, in 206, the query statement corresponding to the query type determined in 204 can be generated according to both the filtering condition and the output condition for the resource that are parsed out in 203, and then a query result that complies with the output condition can be queried through the query statement and be output. In this case, for example, for the above example, when the query type determined in 204-2 is the PostgREST type, the query statement generated in 206 can be "/volume?select=id,name, description &name=eq.Test &order=name.asc"; and when the query type determined in 204-2 is the JDBC type, the query statement generated in 206 may be "select id, name, description from volume where name 'Test' order by name asc".

It should be understood that the above example query content and query statement are only examples, and any content can be queried and any form of query statement can be set according to practical applications. In addition, it should be understood that in order to output query results obtained through various types of query interfaces, the query results obtained through the query interfaces can also be appropriately converted. For example, when a query result is obtained from a JDBC-type query interface, the query result can be converted into data of the JsonObject or JsonArray type so that it can be output from the REST storage system.

The above approach allows the storage system to integrate various types of interfaces and various types of databases and not be limited by the PostgREST framework. The storage system can establish any appropriate correspondence for various interfaces and databases it integrates, and can set any form of query statement, thus making the storage system to have a wider range of queries and a more flexible way of querying, and to be more adaptable to individual needs of users.

Further, in addition to receiving the query request (GET class request) as described above and obtaining the query result as described above, the method according to embodiments of the present disclosure may also include: receiving an editing request (for example, a SET class request as described above, e.g., a patch request, a post request, or a delete request) for performing an editing operation in the storage system; determining a target database in the storage system indicated by the editing request; and accessing the target database through a microservice (e.g., the microservice 340 in FIG. 3) to perform the editing operation. In one embodiment, the editing operation may include at least one of: a patch operation, a post operation, or a delete operation.

In this way, the path for GET class requests and the path for SET class requests can be completely separated, thus reducing the workload of the microservice and improving the query efficiency and overall operation efficiency of the storage system.

Figure 5:
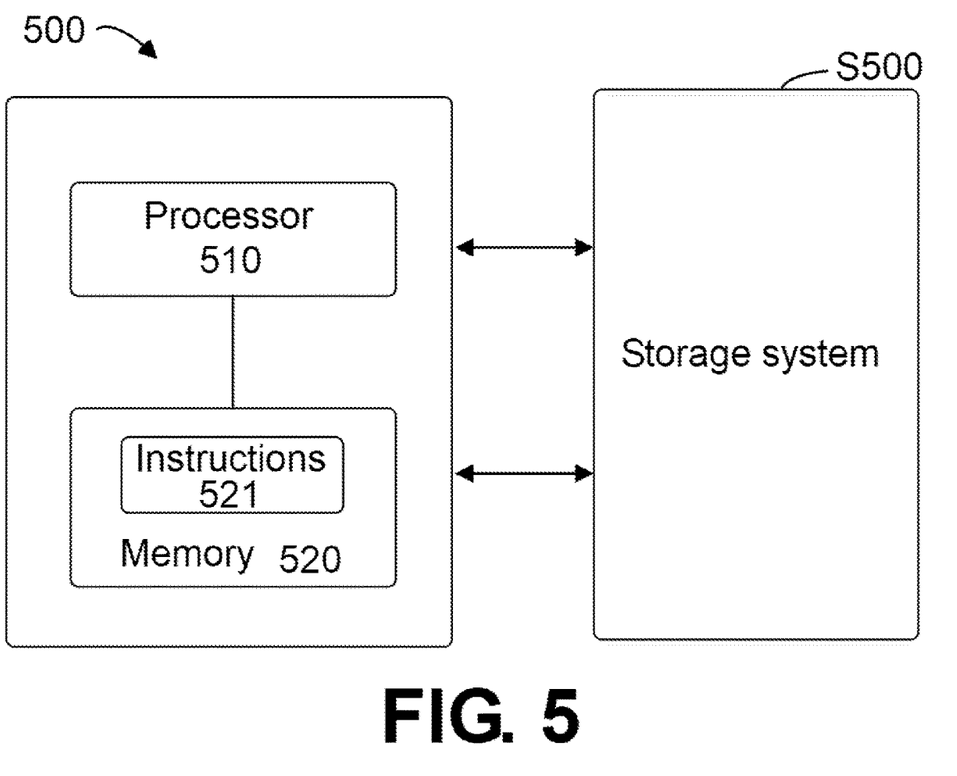
FIG. 5 illustrates a block diagram of a storage system according to an embodiment of the present disclosure.

FIG. 5 illustrates a block diagram of an electronic device 500 according to an embodiment of the present disclosure. The electronic device 500 shown in FIG. 5 may interact with the storage system S500 or be integrated in the storage system S500.

The electronic device 500 may include at least one processor 510 and a memory 520. The memory 520 is coupled to the at least one processor 510 and has instructions 521 stored thereon. The instructions 521, when executed by the at least one processor 510, cause the electronic device 500 to perform the following actions: receiving a query request for querying a resource in the storage system; determining a query type of the query request according to configuration information; generating a corresponding query statement according to the query type; and querying the resource from the storage system through the query statement.

In some embodiments, the actions may also include parsing the query request to obtain query information for the resource.

In some embodiments, the query information may include a resource type of the resource, and determining a query type of the query request according to configuration information may include: determining a query interface type of a query interface corresponding to the resource type according to the resource type and the configuration information, wherein the query interface is an interface for accessing a database storing the resource of the resource type in the storage system; and determining the query type based on the query interface type.

In some embodiments, the query information may also include a filtering condition for the resource, and generating a corresponding query statement according to the query type may include generating a query statement corresponding to the query type according to the filtering condition.

In some embodiments, querying the resource from the storage system through the query statement may include acquiring a query result for the resource from the database via the query interface through the query statement.

In some embodiments, the query information may also include an output condition for the resource, and the above actions may also include outputting the query result for the resource in accordance with the output condition.

In some embodiments, the storage system may include a plurality of databases of different database types, wherein each database type has at least one corresponding database, and each database type has a corresponding query interface type, and wherein in the storage system, resources of each resource type are stored in at least one database of a corresponding database type.

In some embodiments, querying the resource from the storage system through the query statement may include acquiring a query result for the resource from the database in accordance with a predetermined query rule via the query interface through the query statement. The predetermined query rule may include at least one of: query by row, query by column, query by page, query at least two databases simultaneously, or query the at least two databases sequentially.

In some embodiments, the above actions may further include determining at least one of: a correspondence between query interface types and resource types applied to the storage system; a correspondence between query interface types and database types applied to the storage system; a correspondence between database types and resource types applied to the storage system; one or more databases in which each type of resource of the storage system is stored; or formats of query statements applied to the storage system.

In some embodiments, the query interface type may include at least one of: a PostgREST type, a JDBC type, or a Jooq type.

In some embodiments, the query request may be a query request conforming to the REST specification.

In some embodiments, the above actions may further include receiving an editing request for performing an editing operation in the storage system; determining a target database in the storage system indicated by the editing request; and accessing the target database through a microservice to perform the editing operation.

In some embodiments, the editing operation may include at least one of: a patch operation, a post operation, or a delete operation.

In other words, the electronic device 500 shown in FIG. 5 can perform any of the operations in the method illustrated above with reference to FIGS. 2 to 4.

With the electronic device according to the embodiment of the present disclosure illustrated in FIG. 5, a query can be made directly to the storage system by generating a query statement corresponding to the query request, thereby improving the query efficiency in making queries to the storage system and enhancing the user experience.

FIGS. 6A to 6E illustrate schematic diagrams of modeling language architectures for implementing code of instructions 521 executed by the electronic device of FIG. 5.

The modules in the modeling language architecture illustrated in FIGS. 6A to 6E are associated by the dashed blocks and arrows illustrated in FIGS. 6A to 6E, thereby forming the modeling language architecture as a whole. This modeling language architecture can be used to generate the code of the instructions 521 executed by the processor 510 of the electronic device 500 as shown in FIG. 5.

As shown in FIGS. 6A to 6E, the modeling language architecture in general may include modules 602, 604, 606, and 608, with the module 606 being illustrated with modules 606-1, 606-2, and 606-3.

The module 602 can be used to achieve interaction with external parties, such as receiving a query request or outputting a query result.

The module 604 can be used to perform corresponding processing on a received query request, such as determining the query type of the query request and generating a query statement; and the module 604 can be used to achieve corresponding processing of the query result, for example, so as to facilitate the output of the query result through the module 602.

Figure 6A:
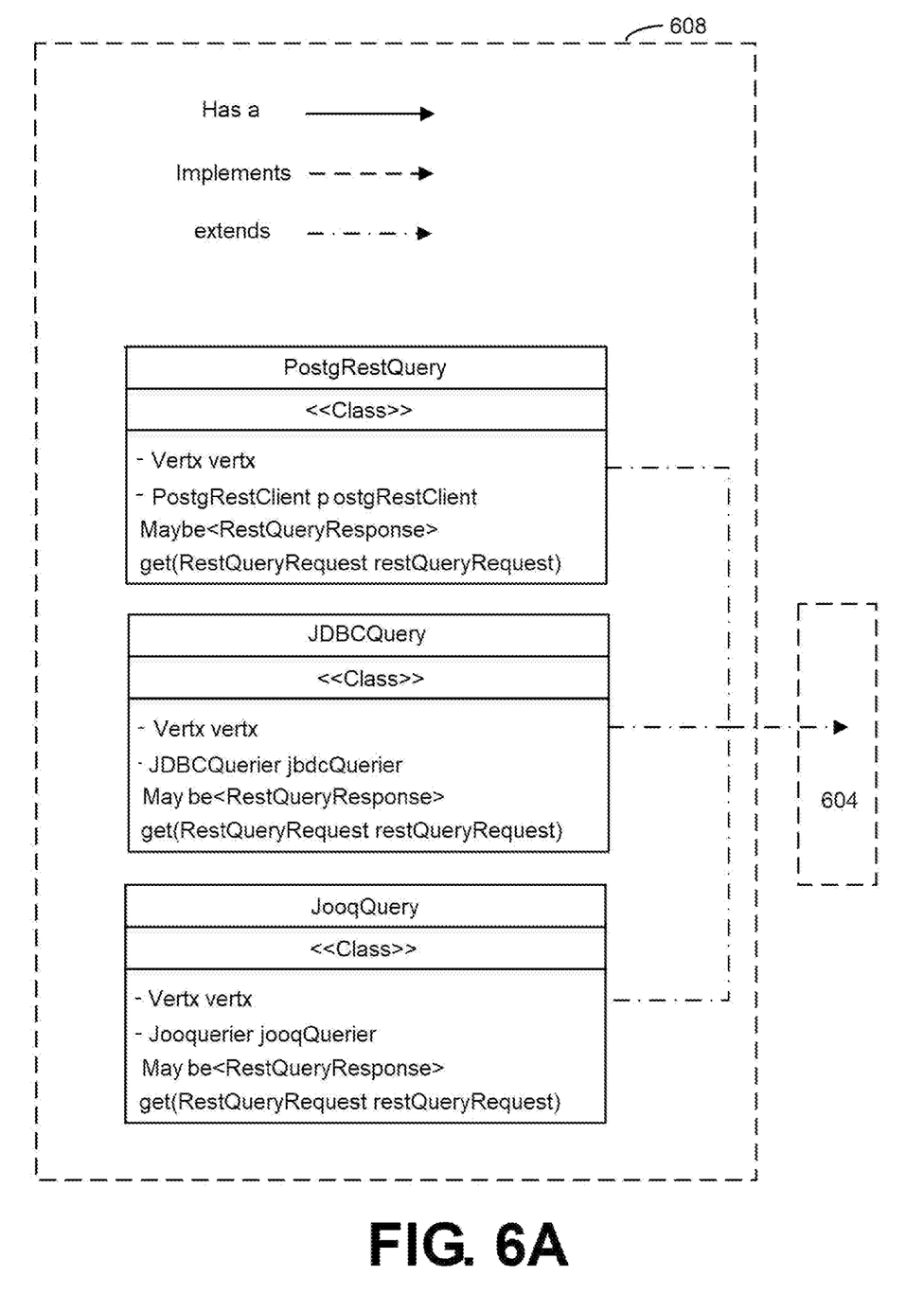
FIGS. 6A to 6E illustrate schematic diagrams of modeling language architectures for implementing code of instructions executed by the electronic device of FIG. 5.
Figure 6B:
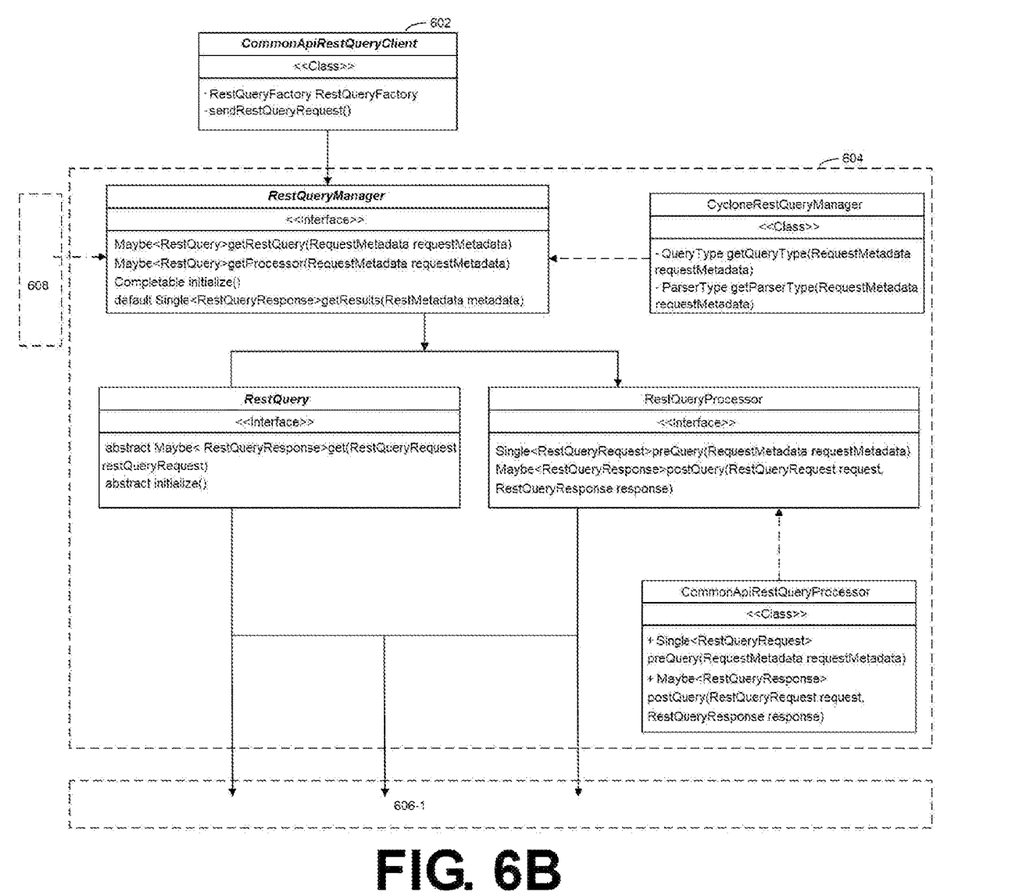
Figure 6C:
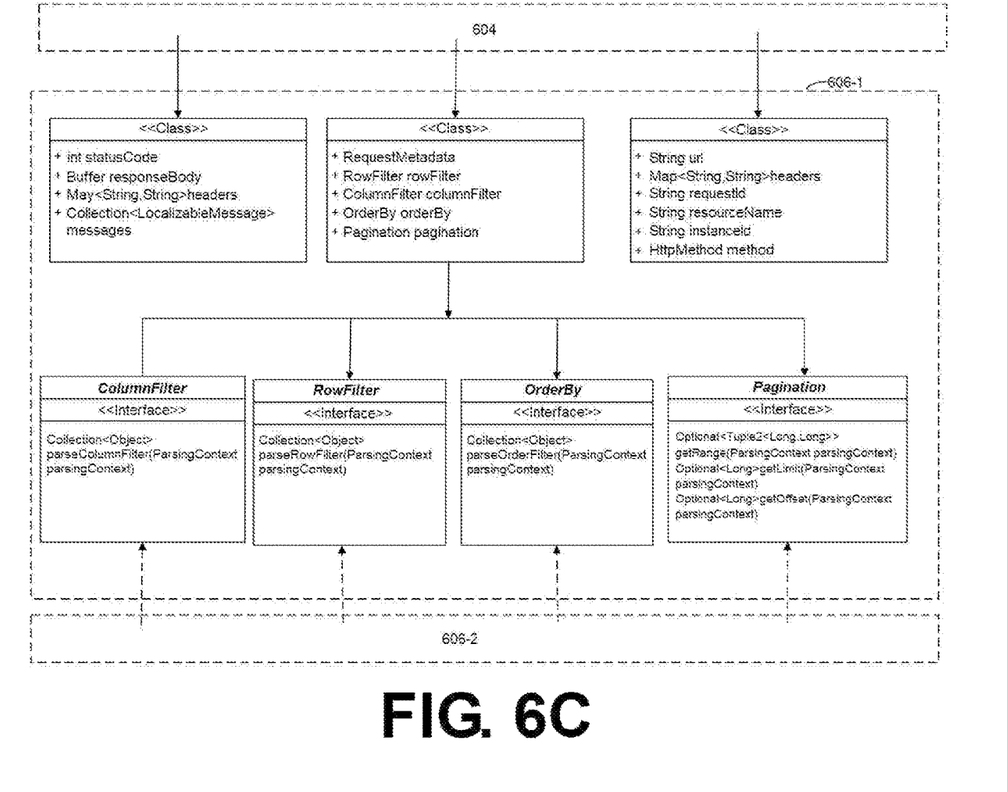
Figure 6D:
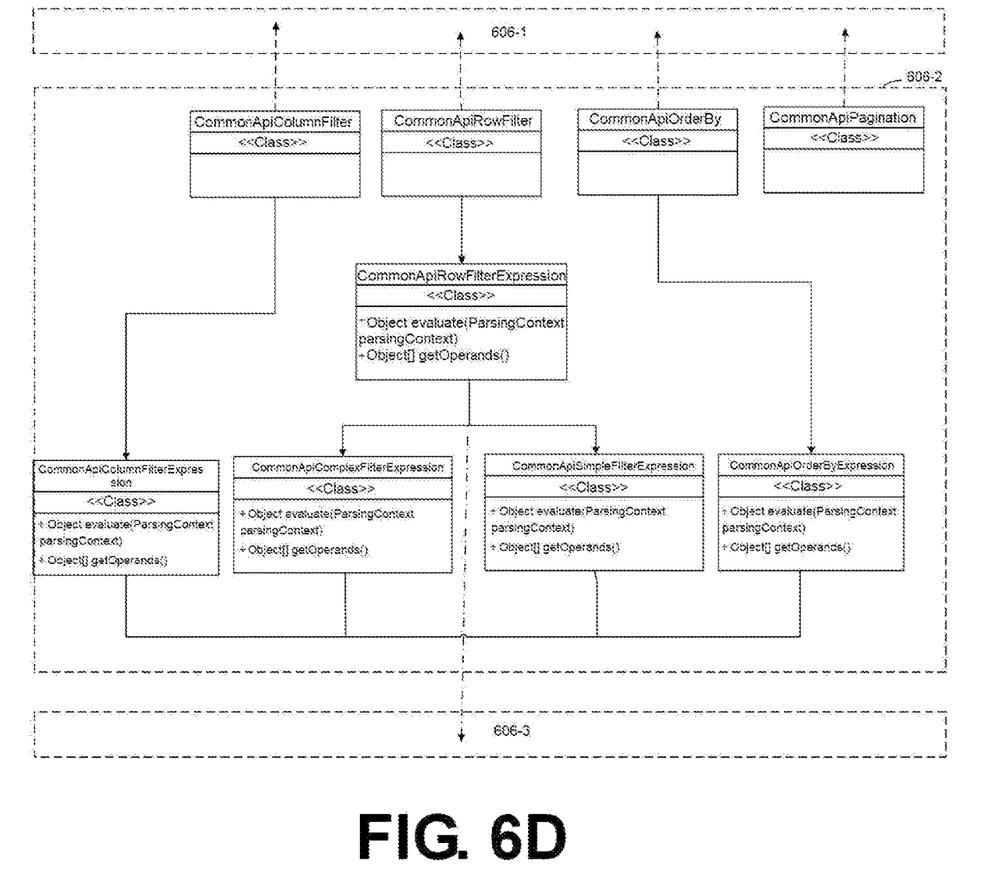
Figure 6E:
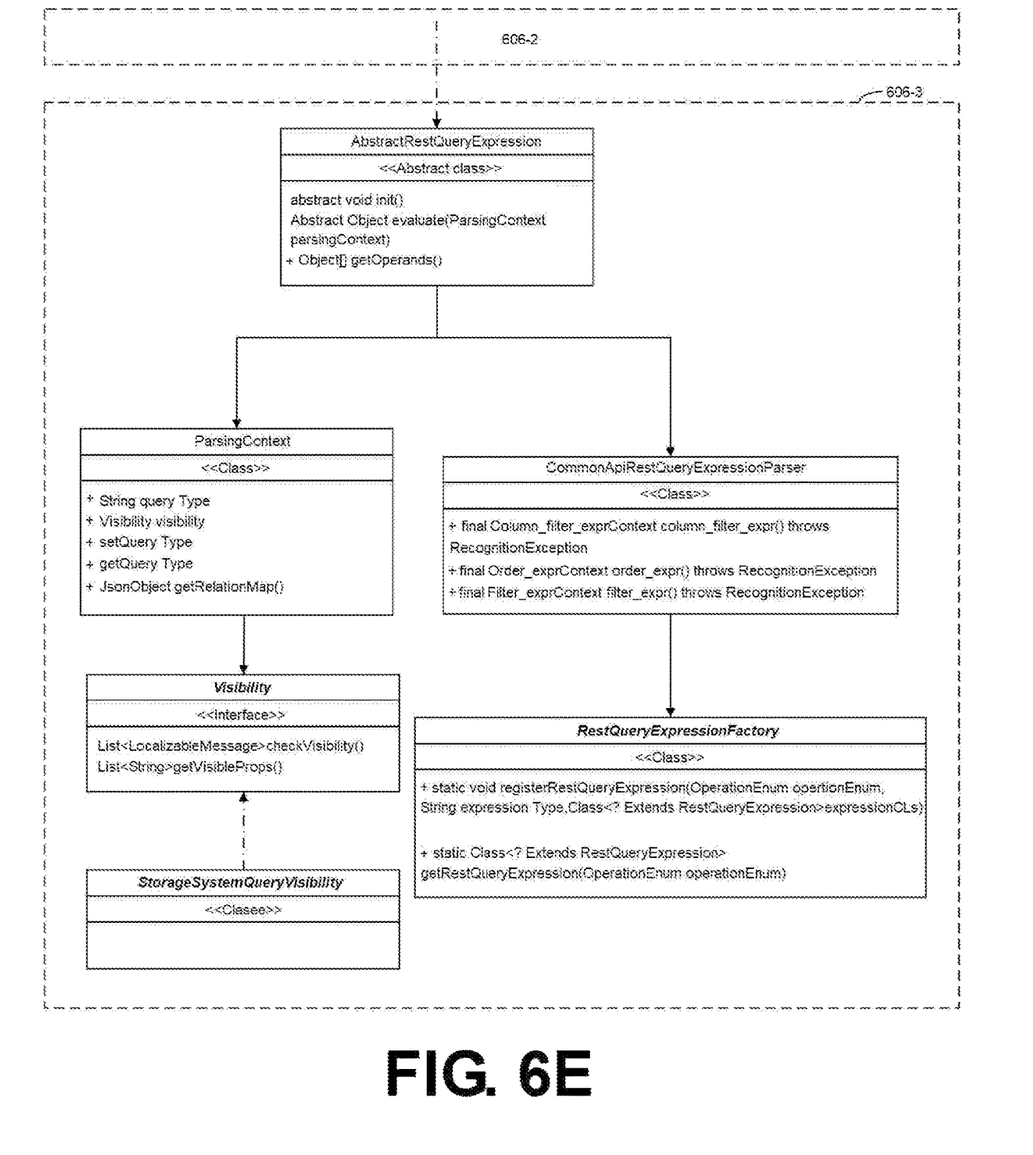

The module 606 (illustrated with the modules 606-1, 606-2, and 606-3) can be used to implement syntax parsing of the query request, for example, syntax parsing via ANTLR to obtain query information, and so on (for example, the class on the right-hand side of FIG. 6E can be automatically generated by ANTLR through the following syntax file: CommonApiRestQueryExpression.g4). The module 604 can use the parsing result from the module 606 to generate a query statement.

The module 608 can represent query statements corresponding to different interface types.

It should be understood that the above modeling language architectures are examples only and that in practice any type of architecture may be used as required to implement the code used to cause the electronic device to perform the instructions of the method described herein.

Figure 7:
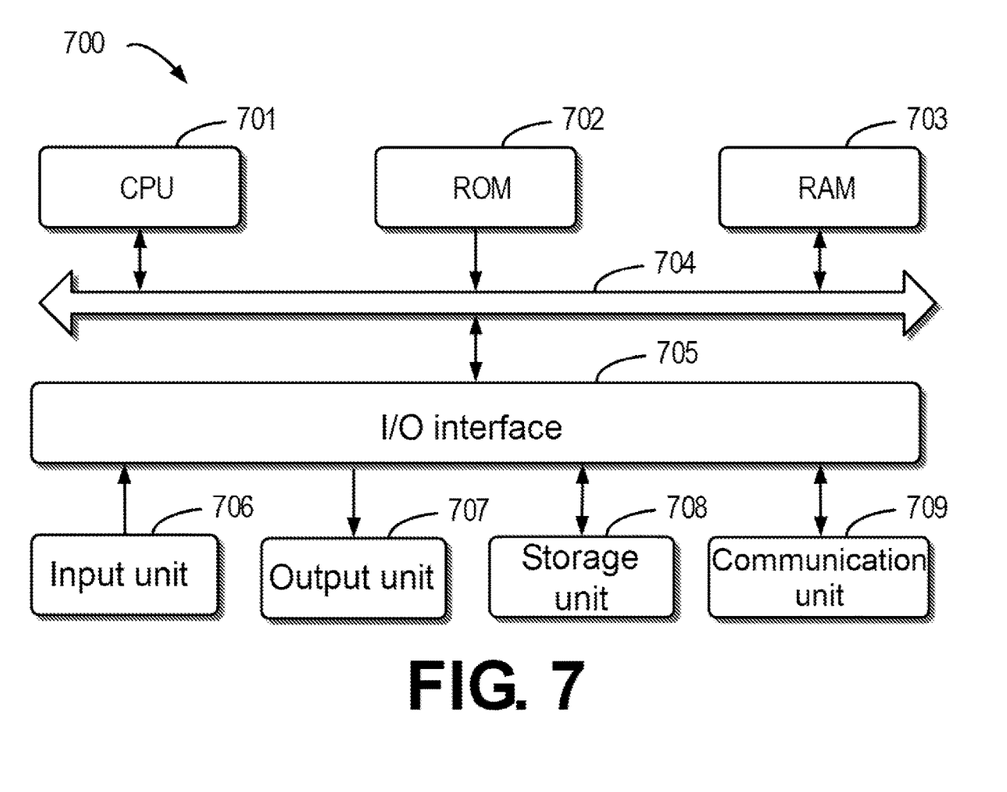
FIG. 7 illustrates a schematic block diagram of an example of an example device applied to implementing embodiments of the present disclosure.

FIG. 7 illustrates a schematic block diagram of an example device 700 which can be used to implement embodiments of the present disclosure. The electronic device in FIG. 5 can be implemented using the device 700. As shown in the figure, the device 700 includes a central processing unit (CPU) 701 that may execute various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An Input/Output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various processes and processing described above, for example, the methods 200 and 400, may be executed by the processing unit 701. For example, in some embodiments, the methods 200 and 400 may be implemented as a computer software program that is tangibly included in a machine-readable medium, such as the storage unit 708. In some embodiments, part or all of the computer programs may be loaded and/or installed onto the device 700 via the ROM 702 and/or the communication unit 709. One or more actions of the methods 200 and 400 described above may be performed when the computer program is loaded into the RAM 703 and executed by the CPU 701.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the technological improvements to technologies on the market, or to enable other persons of ordinary skill in the art to understand the embodiments disclosed herein.

The invention claimed is:

1. A method, comprising:
   receiving, at a storage system, a plurality of access requests from a user computer, the plurality of access requests including a query request for querying a resource in the storage system, and an editing request for performing an editing operation in the storage system;
   executing, on processing circuitry of the storage system, first instructions along a first executable path of a computer program to perform first actions comprising:
   identifying a query type of the query request;
   identifying a query interface type corresponding to the query type, the query interface type being one of a plurality of query interface application programming interface (API) types;
   identifying a query interface corresponding to the query interface type, the query interface being one of a plurality of query interface APIs, the query interface corresponding to a first database in which the resource is located;
   generating a query statement for accessing the first database via the query interface;
   obtaining a query result by querying the resource from the first database using the query statement; and
   sending the query result to the user computer; and
   executing, on the processing circuitry of the storage system, second instructions along a second executable path of the computer program to perform second actions comprising:
   identifying the first database or a different database as a target database for the editing request;
   accessing the identified first database or the different database via a microservice in the second executable path of the computer program; and
   performing the editing operation on the identified first database or the different database,
   wherein the second executable path is separate from the first executable path, and
   wherein the first executable path does not include any microservice of the computer program.

2. The method according to claim 1, wherein the identifying of the query type of the query request comprises:
   parsing the query request to obtain query information for the resource, the query information including a resource type from among a plurality of resource types, a filtering condition for the resource, and an output condition for the resource,
   wherein configuration information for the storage system includes a correspondence between the resource type and the query interface type.

3. The method according to claim 1, wherein the querying of the resource from the first database using the query statement comprises:
   acquiring the query result for the resource from the first database via the query interface using the query statement.

4. The method according to claim 3, further comprising:
   outputting the query result for the resource in accordance with the output condition.

5. The method according to claim 2, wherein the storage system comprises a plurality of databases of different database types, wherein each database type corresponds to at least one database from among the plurality of databases, and each database type corresponds to a respective query interface type from among a plurality of query interface types, and
   wherein, in the storage system, resources of each of the plurality of resource types are stored in at least one database of a corresponding database type.

6. The method according to claim 5, wherein the querying of the resource from the first database using the query statement comprises:
   acquiring the query result for the resource from the first database in accordance with a predetermined query rule via the query interface using the query statement,
   wherein the predetermined query rule comprises at least one of:
      query by row, query by column, query by page, query at least two databases simultaneously, and query the at least two databases sequentially.

7. The method according to claim 5, wherein the configuration information comprises at least one of:
   the correspondence between the resource type and the respective query interface type;
   a correspondence between the respective query interface type and the corresponding database type;
   a correspondence between the corresponding database type and the resource type;
   one or more of the plurality of databases in which the resource type of the resource is stored; and
   formats of a plurality of query statements applied to the storage system.

8. The method according to claim 2, wherein the respective query interface type comprises at least one of:
   a PostgREST type, a JDBC type, and a Jooq type.

9. The method according to claim 2, wherein the query request conforms to the REST (Representational State Transfer) specification.

10. The method according to claim 1, wherein the editing operation comprises at least one of:
    a patch operation, a post operation, and a delete operation.

11. A system, comprising:
    a memory; and
    processing circuitry configured to execute, out of the memory, a set of instructions of a computer program to:
       receive a plurality of access requests from a user computer, the plurality of access requests including a query request for querying a resource in the storage system, and an editing request for performing an editing operation in the storage system,
    wherein the set of instructions includes first instructions and second instructions, and
    wherein the processing circuitry is configured to execute, out of the memory, the first instructions along a first executable path of the computer program to:

identify a query type of the query request;
identify a query interface type corresponding to the query type, the query interface type being one of a plurality of query interface application programming interface (API) types;
identify a query interface corresponding to the query interface type, the query interface being one of a plurality of query interface APIs, the query interface corresponding to a first database in which the resource is located;
generate a query statement for accessing the first database via the query interface;
obtain a query result by querying the resource from the first database using the query statement; and
send the query result to the user computer,
wherein the processing circuitry is configured to execute, out of the memory, the second instructions along a second executable path of the computer program to:
identify the first database or a different database as a target database for the editing request;
access the identified first database or the different database via a microservice in the second executable path of the computer program; and
perform the editing operation on the identified first database or the different database,
wherein the second executable path is separate from the first executable path, and
wherein the first executable path does not include any microservice of the computer program.

12. The system according to claim 11,
wherein the processing circuitry is configured to execute, out of the memory, the first instructions along the first executable path of the computer program to:
parse the query request to obtain query information for the resource, the query information including a resource type from among a plurality of resource types, a filtering condition for the resource, and an output condition for the resource,
wherein configuration information for the storage system includes a correspondence between the resource type and the query interface type.

13. The system according to claim 12, wherein the querying of the resource from the first database using the query statement comprises:
acquiring the query result for the resource from the first database via the query interface using the query statement.

14. The electronic device according to claim 13, wherein the actions further comprise:
outputting the query result for the resource in accordance with the output condition.

15. The system according to claim 12, wherein the resource has a resource name, and wherein the filtering condition for the resource is based on at least a portion of the resource name.

16. The system according to claim 12, wherein the resource has a resource identifier, a resource name, and a resource property, and wherein the output condition for the resource is based on at least one of the resource identifier, the resource name, and a description of the resource property.

17. A computer program product including a set of non-transitory, computer-readable media having a set of instructions of a computer program that, when executed by processing circuitry, cause the processing circuitry to perform a method comprising:
receiving, at a storage system, a plurality of access requests from a user computer, the plurality of access requests including a query request for querying a resource in the storage system, and an editing request for performing an editing operation in the storage system,
wherein the set of instructions includes first instructions and second instructions;
executing the first instructions along a first executable path of the computer program to perform first actions comprising:
identifying a query type of the query request;
identifying a query interface type corresponding to the query type, the query interface type being one of a plurality of query interface application programming interface (API) types;
identifying a query interface corresponding to the query interface type, the query interface being one of a plurality of query interface APIs, the query interface corresponding to a first database in which the resource is located;
generating a query statement for accessing the first database via the query interface;
obtaining a query result by querying the resource from the first database using the query statement; and
sending the query result to the user computer; and
executing the second instructions along a second executable path of the computer program to perform second actions comprising:
identifying the first database or a different database as a target database for the editing request;
accessing the identified first database or the different database via a microservice in the second executable path of the computer program; and
performing the editing operation on the identified first database or the different database,
wherein the second executable path is separate from the first executable path, and
wherein the first executable path does not include any microservice of the computer program.

18. The computer program product according to claim 17, wherein the identifying of the query type of the query request comprises:
parsing the query request to obtain query information for the resource, the query information including a resource type from among a plurality of resource types, a filtering condition for the resource, and an output condition for the resource,
wherein configuration information for the storage system includes a correspondence between the resource type and the query interface type.

* * * * *